US007054466B2

(12) United States Patent
Knox et al.

(10) Patent No.: US 7,054,466 B2
(45) Date of Patent: May 30, 2006

(54) ORIENTATION DETERMINATION

(75) Inventors: Andrew Ramsay Knox, Kilbirnie (GB); Anthony Cyril Lowe, Braishfield (GB)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 10/202,360

(22) Filed: Jul. 24, 2002

(65) Prior Publication Data

US 2004/0017931 A1   Jan. 29, 2004

(30) Foreign Application Priority Data

Aug. 10, 2001  (GB)  ................... 0119491.9

(51) Int. Cl.
  *B25J 19/00*  (2006.01)
  *G05D 1/00*  (2006.01)
  *G06K 9/00*  (2006.01)
  *G06K 9/46*  (2006.01)
  *H04N 7/18*  (2006.01)
(52) U.S. Cl. ............... 382/103; 382/199; 382/203; 382/291; 348/113; 701/28; 901/46; 901/47
(58) Field of Classification Search ............... 382/103, 382/104, 199, 203, 291; 701/28; 348/113; 901/46, 47
See application file for complete search history.

(56) References Cited

U.S. PATENT DOCUMENTS

| 3,953,111 | A | * | 4/1976 | Fisher et al. ................ 359/714 |
| 4,626,995 | A | * | 12/1986 | Lofgren et al. .............. 701/24 |
| 4,786,167 | A | * | 11/1988 | Rothbone et al. ......... 356/141.5 |
| 5,051,906 | A | * | 9/1991 | Evans et al. ................. 701/28 |
| 5,155,683 | A | * | 10/1992 | Rahim ........................ 701/25 |
| 5,559,695 | A | * | 9/1996 | Daily .......................... 701/1 |
| 5,745,804 | A | * | 4/1998 | Iwane ........................ 396/93 |
| 6,208,748 | B1 | * | 3/2001 | Troccolo et al. ........... 382/100 |
| 6,249,591 | B1 | * | 6/2001 | Tullis ......................... 382/106 |
| 6,459,955 | B1 | * | 10/2002 | Bartsch et al. ............. 700/245 |
| 6,489,945 | B1 | * | 12/2002 | Gordon ...................... 345/158 |
| 6,549,290 | B1 | * | 4/2003 | Miura et al. ................ 356/614 |
| 6,785,404 | B1 | * | 8/2004 | Shimazaki et al. ......... 382/104 |

* cited by examiner

*Primary Examiner*—Jingge Wu
*Assistant Examiner*—Anthony Mackowey
(74) *Attorney, Agent, or Firm*—Jeanine S. Ray-Yarletts; Daniel E. McConnell

(57) ABSTRACT

An improved orientation system includes a lens pre-distorting an image generated by imaging apparatus such that a non-linearity, the degree of which is dependent on the off-axis distance of an imaged object, is generated so as to increase the strength of a signal indicating said non-linearity.

8 Claims, 3 Drawing Sheets

ORIENTATION DETERMINATION

TECHNICAL FIELD OF THE INVENTION

The present invention relates to determining the orientation of a moving object and more particularly to determining the relative orientation of a moving object with respect to its direction of travel.

BACKGROUND OF THE INVENTION

Imaging systems can determine the orientation of an object by analysis of a number of successive images of the object through digital signal processing. When two objects are approaching each other (one or both objects may be moving) any deviation from the required direction needs to be quickly and accurately determined. Prior art methods do not presently provide an optimum performance in order to control a servo mechanism for re-orientation.

U.S. Pat. No. 4,724,480 discloses an arrangement for determining the alignment of one object relative to another object. A light pattern is projected from a first object onto a second object. The signals from a camera mounted on the first object are used to determine the relative position and orientation of the second object.

U.S. Pat. No. 5,475,584 discloses a method for recovering the orientation of a camera with respect to a coordinate system by projecting onto an image plane three images of three gratings formed on three planes with three wavelength vectors.

U.S. Pat. No. 5,982,549 discloses a vision system that increases the field of view of an electronic binocular system without degrading image quality. The imaging device comprises a compression lens and an image sensor. The viewing device comprises an image display and a decomposition lens. The decompression lens compensates for the effect of the compression lens so that the devices see the image as it was seen by the imaging device without any introduced distortion.

It would be desirable to provide an improved system and method for determining the orientation of an object which gave a strong indication of the error.

SUMMARY OF THE INVENTION

Accordingly the invention provides a system for determining orientation relative to a remote object comprising: imaging apparatus for producing an image of a remote object; processing apparatus for processing the produced image to determine the orientation; characterised in that the system further comprises: a lens located between the remote object and the imaging apparatus, the lens having a non-linearity dependent on the distance of the remote object from the axis of the imaging apparatus.

The lens produces a highly non-linear image on the imaging means which has the advantage of increasing the strength of a signal derived from the image when the object being imaged is off-axis.

The invention also provides a method of determining orientation relative to a remote object, the method comprising the steps of: receiving an image of the remote object; producing a non-linearity in the received image, the degree of non-linearity being dependent on the distance of the remote object from a central axis; producing an image of the remote object, the image including the introduced non-linearity; processing the produced image by using the non-linearity in the image to determine orientation.

BRIEF DESCRIPTION OF THE DRAWINGS

The invention will now be described, by way of example only, with reference to the accompanying drawings in which.

DETAILED DESCRIPTION OF PREFERRED EMBODIMENTS OF THE INVENTION

Figure 1:
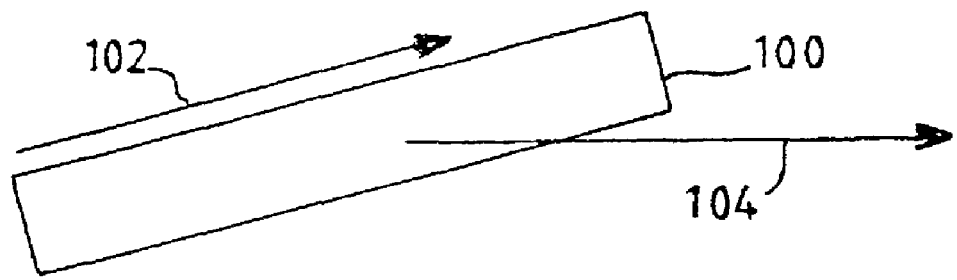
FIG. 1 show a vehicle having an orientation and a direction of travel.

FIG. 1 shows a vehicle 100 having a direction of orientation 102 and a direction of motion 104. The term vehicle will be used in this specification to refer to the platform on which a camera is mounted, but the invention is equally applicable to anything that moves and needs to determine its orientation relative to an object or to determine its orientation relative to a direction of motion. Examples of the application of this invention include robots, ships and aircraft as well as land vehicles. In such applications, it is useful to know the vehicle orientation relative to the direction of travel through the environment.

Figure 2:
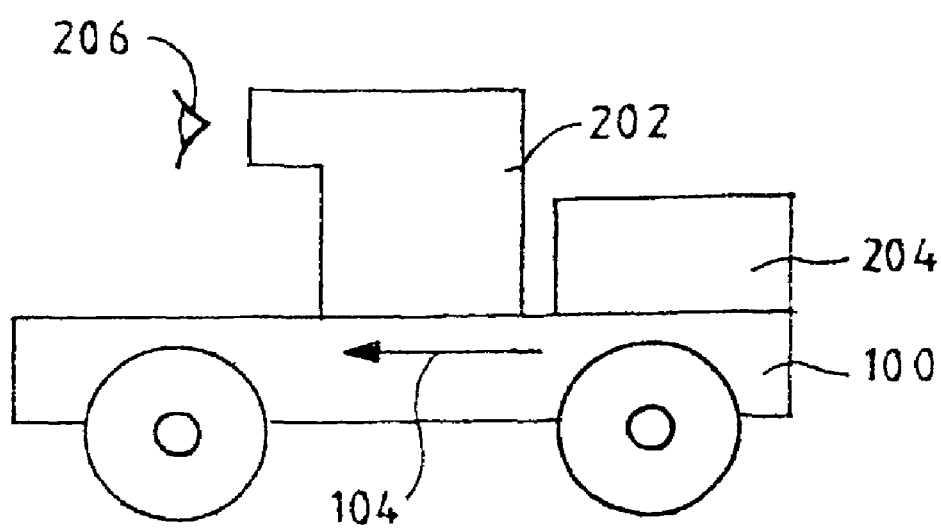
FIG. 2 shows a camera and processor positioned on the vehicle of FIG. 1 and used to implement the present invention.

FIG. 2 shows a camera 202 mounted on a vehicle 100 together with a processor 204 for processing the output of the camera and a lens system 206 for modifying the image seen by the camera. The processor 204 examines the image from the camera 202 on a frame-by-frame basis and using standard digital signal processing (DSP) techniques extracts useful reference information such as, for example, outlines, edges or corners. The lens system 206 is located in front of the camera 202 and is arranged to produce a highly non-linear image on the camera, the degree of non-linearity being dependent on the distance of the object from the axis of the camera. The camera is preferably a CCD camera, although other camera technologies could be used. The processor is preferably a single chip microprocessor, but could also be a self-contained single board processor or the processor could be located remotely with a communications link to the vehicle.

Figure 3:
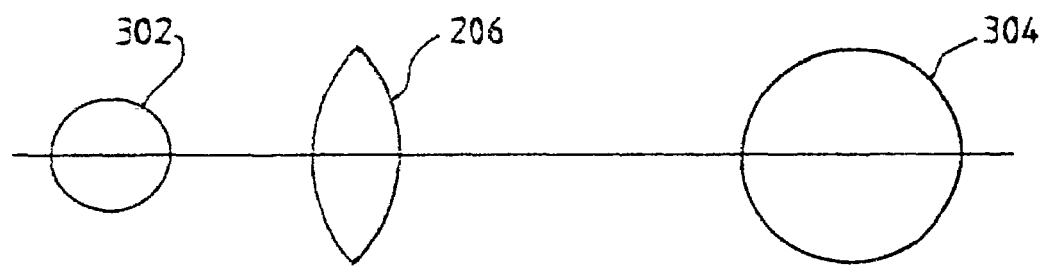
FIG. 3 shows the image from the camera of FIG. 2 when object and camera are in a paraxial condition.

FIG. 3 shows an object 302 located paraxially or on the axis of the camera 202. The camera 202 views the object through the lens system 206. Since the object is on the axis of the camera 202 and the lens system 206, the image 304 as seen by the camera 202 corresponds to that of the object 302. The camera axis is orientated towards the object and relative motion of the camera 202 along its axis will take it directly towards or directly away from the object 302.

Figure 4:
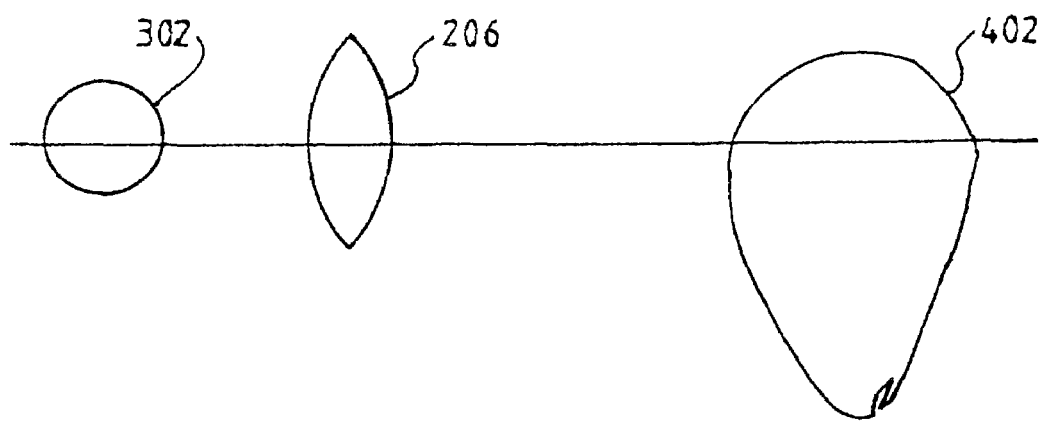
FIG. 4 shows the image from the camera of FIG. 2 when object and camera are in an off-axis condition.

FIG. 4 shows an object 302 located off-axis relative to the camera 202. Since the object 302 is viewed off the paraxial direction, the lens system is arranged to dramatically magnify the object 302, thus creating a comet tail, or a "coma" in the image 402. This form of aberration can be made much worse than a geometric aberration, which would lead to barrel or pincushion distortion.

Figure 5:
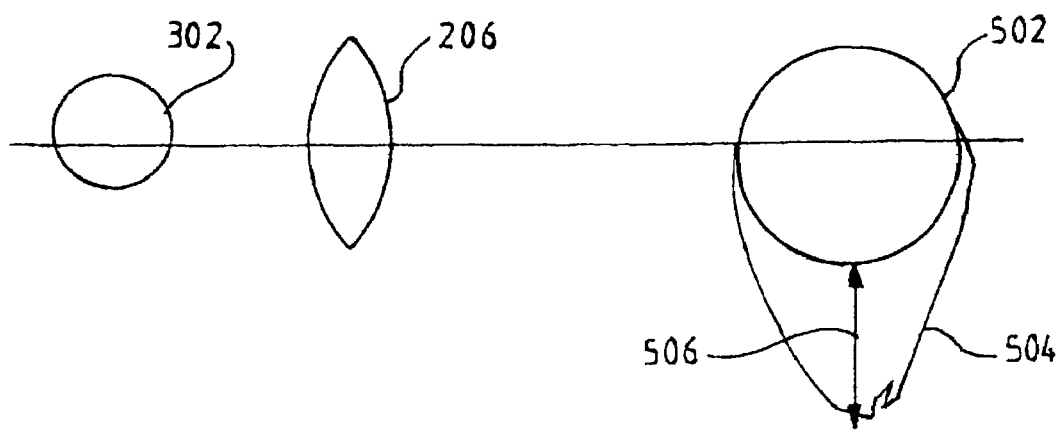
FIG. 5 shows the signal available for servo correction in the off-axis condition shown in FIG. 4.

FIG. 5 shows the expected position 502 of the image without the "coma" distortion and the actual image 504 with the "coma" distortion. As the camera 202 approaches the object 302, the processor 204 carries out DSP analysis in order to determine the outline of the object 302. Analysis on the expected position 502 without the "coma" distortion generates only a weak signal to be used for feedback to a servo mechanism to orient the object 302 on the camera 202 axis. Analysis on the actual image 504 with the "coma" distortion generates a strong signal to be used for feedback to a servo mechanism to orient the object 302 on the camera 202 axis. The additional signal available for servo correction is shown by reference numeral 506 in FIG. 5.

Figure 6:
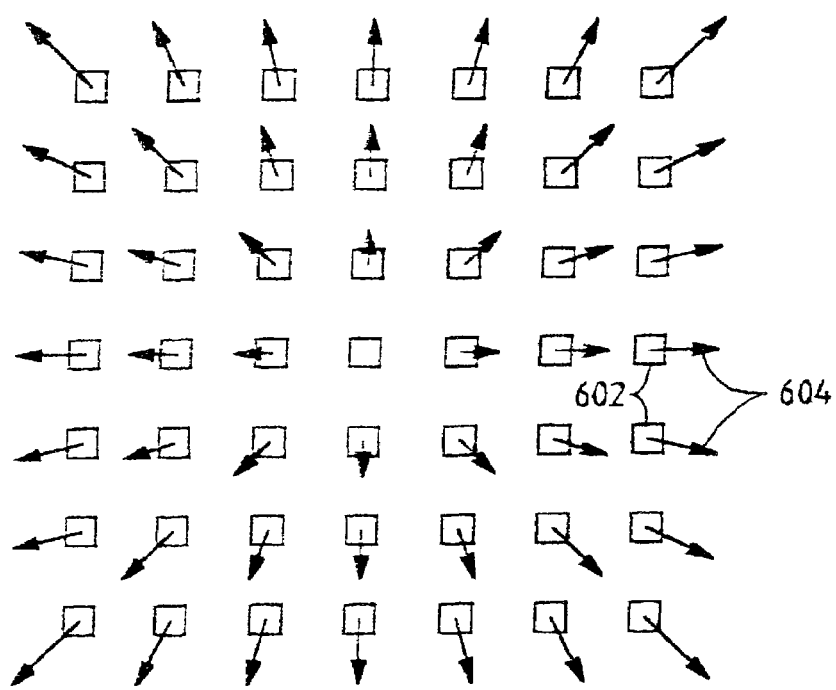
FIG. 6 shows the conceptual change in image seen by the camera of FIG. 2 when the camera moves towards the object in the paraxial condition of FIG. 3.

FIG. 6 shows the conceptual change in image seen by the camera 202 when the orientation 102 and direction 104 vectors are parallel. FIG. 2 shows a single image of this situation, whilst FIG. 6 shows the changes between successive image frames. The DSP analysis using outlines, edges or corners identifies that there is relative motion of the image between successive frames. Each square 602 in FIG. 6 represents a pixel and each arrow 604 represents the direction of "expansion" of the image between successive frames as the vehicle 100 moves towards the object 302. The length of each of the arrows 604 represents the amplitude of the relative motion.

Figure 7:
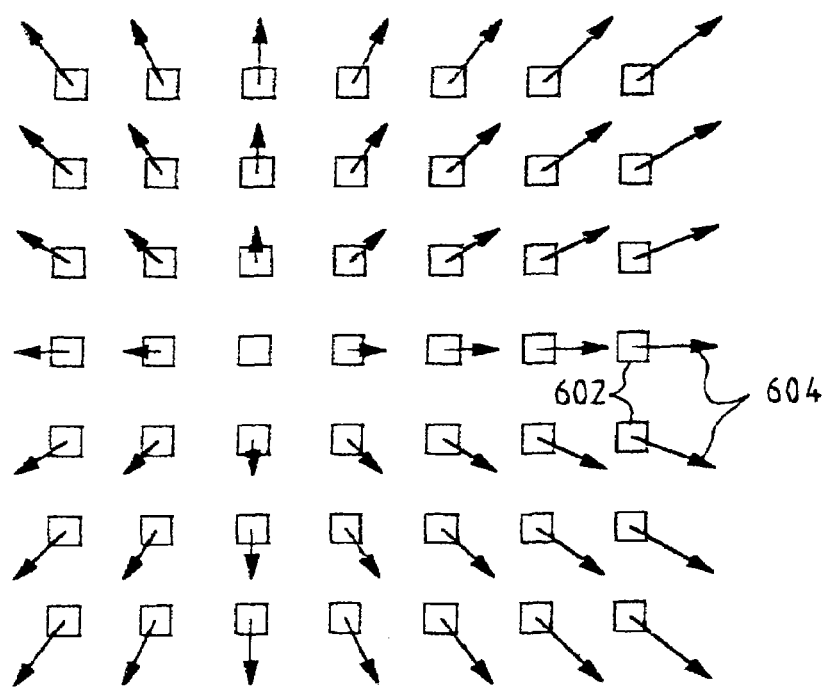
FIG. 7 shows the conceptual change in image seen by the camera of FIG. 2 when the camera moves towards the object in the off-axis condition of FIG. 4.

FIG. 7 shows the conceptual change in image seen by the camera 202 when the orientation 102 and direction 104 vectors are not parallel. FIG. 3 shows a single image of this situation, whilst FIG. 7 shows the changes between successive image frames. The squares 602 and arrows 604 of FIG. 7 have the same meaning as those of FIG. 6 and similar DSP analysis has been completed. From the interpretation of the arrows 604 it is possible to determine from successive image frames the relative orientation 102 of the vehicle 100 relative to the direction 104 of travel. The present invention of using a lens system 206 which has deliberately introduced "coma" distortion increases the amplitude of the signal available for correction of the orientation 102.

While the preferred embodiments have been described here in detail, it will be clear to those skilled in the art that many variants are possible without departing from the spirit and scope of the present invention.

What is claimed is:

1. A system comprising:
   imaging apparatus for producing an image of a remote object;
   a lens located between the remote object and the imaging apparatus, the lens intentionally introducing a non-linearity into the produced image, the introduced non-linearity being dependent upon the distance of the remote object from the central axis of the imaging apparatus; and
   processing apparatus for processing the produced image to determine the orientation of the object relative to the system by using the introducing non-linearity.

2. A system as claimed in claim 1 wherein the processing apparatus uses outlines, edges or corners derived from the produced image to determine orientation.

3. A system as claimed in claim 1 wherein the processing apparatus uses successive frame of the image to determine relative motion.

4. A system as claimed in claim 1 wherein the orientation information from the processing apparatus is used to provide feedback in a servo system.

5. A method of determining orientation relative to a remote object, the method comprising the steps of:
   receiving an image of the remote object;
   producing a non-linearity in the received image, the degree of non-linearity being dependent on the distance of the remote object from a central axis;
   producing an image of the remote object, the image including the introduced non-linearity;
   processing the produced image by using the non-linearity in the image to determine orientation.

6. A method as claimed in claim 5 wherein the step of processing the produced image includes the step of deriving outlines, image or corners from the produced image.

7. A method as claimed in claim 5 wherein the step of processing the produced image includes the step of using successive frames of the produced image to determine relative motion.

8. A method as claimed in claim 5 further comprising the step of transmitting the determined orientation information to a feedback system to provide modification of the orientation.

* * * * *